US006320896B1

United States Patent
Jovanovich et al.

(10) Patent No.: US 6,320,896 B1
(45) Date of Patent: Nov. 20, 2001

(54) RF RECEIVER HAVING FREQUENCY-HOPPING/DIRECT-SEQUENCE SPREAD SPECTRUM SIGNAL DISCRIMINATION

(75) Inventors: Alan F. Jovanovich, Des Moines; John W. Mensonides, Monroe; Bruce G. Warren, Poulsbo, all of WA (US)

(73) Assignee: Intermec Ip Corp., Woodland Hills, CA (US)

( * ) Notice: Subject to any disclaimer, the term of this patent is extended or adjusted under 35 U.S.C. 154(b) by 0 days.

(21) Appl. No.: 09/115,286

(22) Filed: Jul. 14, 1998

(51) Int. Cl.[7] .............................. H04B 1/707; H04B 1/713
(52) U.S. Cl. .......................... 375/130; 375/136; 375/147
(58) Field of Search ....................... 375/130, 132, 375/136, 140, 147; 370/320, 335, 342

(56) References Cited

U.S. PATENT DOCUMENTS

| 4,956,644 | * | 9/1990 | Leahy et al. | 342/351 |
| 4,985,899 |   | 1/1991 | Walsh . |   |
| 5,063,572 | * | 11/1991 | Leahy et al. | 375/367 |
| 5,363,401 | * | 11/1994 | Lucas et al. | 375/131 |
| 5,495,500 | * | 2/1996 | Jovanovich et al. | 375/147 |
| 5,748,687 | * | 5/1998 | Ozluturk | 375/367 |
| 5,970,105 | * | 10/1999 | Dacus | 375/344 |
| 5,974,038 | * | 10/1999 | Shou et al. | 370/335 |
| 5,974,098 | * | 10/1999 | Tsuda | 375/340 |
| 6,009,119 | * | 12/1999 | Jovanovich et al. | 375/219 |
| 6,058,148 | * | 5/2000 | Whikehart et al. | 375/350 |
| 6,122,309 | * | 9/2000 | Bergstrom et al. | 375/130 |
| 6,223,053 | * | 4/2001 | Friedmann et al. | 455/552 |

* cited by examiner

*Primary Examiner*—Young T. Tse
(74) *Attorney, Agent, or Firm*—O'Melveny & Myers LLP

(57) ABSTRACT

A receiver is provided for use in an environment in which both frequency-hopping and direct-sequence spread spectrum radio frequency (RF) signals are present. The receiver includes a receive section adapted to receive and downconvert RF input signals. A detector is coupled to the receive section, and has a plurality of parallel filter stages with each tuned for a distinct frequency band. A discriminator compares the RF energy level passing through each of the filter stages to determine whether the RF input signals are frequency-hopping or direct-sequence spread spectrum signals. A controller is adapted to control the receive section in response to the discriminator.

19 Claims, 2 Drawing Sheets

RF RECEIVER HAVING FREQUENCY-HOPPING/DIRECT-SEQUENCE SPREAD SPECTRUM SIGNAL DISCRIMINATION

BACKGROUND OF THE INVENTION

1. Field of the Invention

The present invention relates to computing devices that communicate with each other within a wireless local area network, and more particularly, to computing devices that operate in an environment in which both frequency-hopping and direct-sequence spread spectrum radio frequency signals are present and which are capable of discriminating between both types of RF signals.

2. Description of Related Art

A wireless local area network (WLAN) comprises a plurality of remote computing devices which communicate together over radio frequency (RF) signals. As in a wired local area network (LAN), the WLAN allows users to seamlessly access disk drives, printers, and additional computer resources connected to the WLAN. The remote computing devices include a radio receiver/transmitter specifically designed or adapted for RF communication with the other elements of the WLAN. The WLAN may also include a central host processing unit that sends information to and receives information from any one of the plurality of remotely disposed computing devices. The central host processor may also form part of a separate wired LAN to provide a bridge with the WLAN. In such a WLAN, the remote computing devices may comprise portable units that operate within a defined environment to report information back to the central host processing unit. WLAN systems offer increased flexibility over wired LAN systems by enabling operators of the remote computing devices substantial freedom of movement through the environment, and are particularly useful for remote data collection applications such as inventory control, manufacturing and production flow management, and asset tracking.

For simplicity, the radio receiver/transmitter provided within each remote computing device may communicate using conventional narrowband RF signals. Narrowband RF operation has a significant drawback in that the radio receiver/transmitter must be operated at relatively low power levels in order to ensure compliance with certain governmental regulations. In addition, low power level signals are more susceptible to interference and thus have low data throughput rates. To overcome these and other drawbacks, commercial WLAN systems have adopted so-called "spread spectrum" modulation techniques. In a spread spectrum system, the transmitted signal is spread over a frequency band that is significantly wider than the minimum bandwidth required to transmit the information being sent. As a result of the signal spreading, spread spectrum systems enable high data integrity and security. Moreover, by spreading transmission power across a broad bandwidth, power levels at any given frequency within the bandwidth are significantly reduced, thereby reducing interference to other radio devices.

In one type of spread spectrum communication system, a modulated RF carrier is moved in discrete increments in a pattern dictated by a pseudorandom sequence. This type of spread spectrum system is known as a "frequency-hopping" modulation system, since the transmitter jumps from frequency to frequency in accordance with the pseudorandom sequence. The information signal is modulated onto the carrier using frequency shift keying (FSK) or other known types of modulation. The instantaneous frequency-hopping spread spectrum signals are similar to conventional narrowband RF communications, except that the center frequency of the signals moves in the pseudorandom sequence with the carrier impressed upon the center frequency.

A second type of spread spectrum communication system utilizes an RF carrier modulated by a digital code sequence having a spreading code rate, or chipping rate, much higher than the clock rate of the information signal. This type of spread spectrum system is known as a "direct-sequence" modulation system, and the modulated signals have a much wider bandwidth than narrowband RF signals or frequency-hopping signals for an equivalent data rate. The RF carrier may be modulated such that a data stream has one phase when a spreading code sequence represents a data "one" and 180° phase shift when the spreading code sequence represents a data "zero." The RF carrier may also be binary or quadrature modulated by one or more data streams such that the data streams have one phase when a spreading code sequence represents a data "one" and a predetermined phase shift (e.g., 180° for binary, and 90° for quadrature) when the spreading code sequence represents a data "zero." These types of modulation are commonly referred to as binary shift key (BPSK) and quadrature shift key (QPSK) modulation, respectively.

It is sometimes desirable to operate remote computing devices in an environment in which both direct-sequence (i.e., wideband) and frequency-hopping (i.e., narrowband) RF communications are present simultaneously. For example, a single WLAN may include disparate elements operating in each of the two modes while sharing a single common host processing unit. In such an environment, it is desirable for the receiver circuitry within the remote computing devices to differentiate between the two types of signals to avoid performance impacts. If an interfering narrowband signal is erroneously interpreted by the receiver as a valid information signal, the receiver could hold off other pending transmissions while trying to synchronize to the narrowband signal, resulting in reduced system throughput and degraded performance.

Thus, it would be desirable to provide a receiver which can discriminate between narrowband and wideband RF signals for use in an environment in which both types of signals are present.

SUMMARY OF THE INVENTION

In accordance with the teachings of the present invention, a receiver for use in an environment in which both frequency-hopping and direct-sequence spread spectrum radio frequency (RF) signals are present is provided.

The receiver includes a receive section to receive and downconvert RF input signals. A discrimination circuit is coupled to the receive section, and has a plurality of parallel filter stages and an envelope detector coupled to the filter stages. Each one of the filter stages is tuned for a distinct frequency band. The envelope detector samples an RF energy level passing through the respective filter stages. The values of the sampled RF energy levels from each of the envelope detectors are compared to provide an indication as to whether the RF input signals are frequency-hopping or direct-sequence spread spectrum signals. A controller is adapted to control the receive section in response to the indication from the discrimination circuit.

More particularly, the RF input signals are determined to be direct-sequence spread spectrum signals when RF energy is present in more than one of the filter stages. Conversely, the RF input signals are determined to be frequency-hopping spread spectrum signals when RF energy is present in only one of the filter stages.

The filter stages further comprise a bandpass filter tuned to one of the distinct frequency bands, and an integrator adapted to integrate received RF energy over a predetermined sample time. Alternatively, the RF input signals may be converted to digital values that are filtered and integrated using digital processing techniques.

A more complete understanding of a receiver having frequency-hopping/direct-sequence spread spectrum signal discrimination will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the need for a receiver which can discriminate between narrowband and wideband RF signals for use in an environment in which both types of signals are present.

Figure 1:
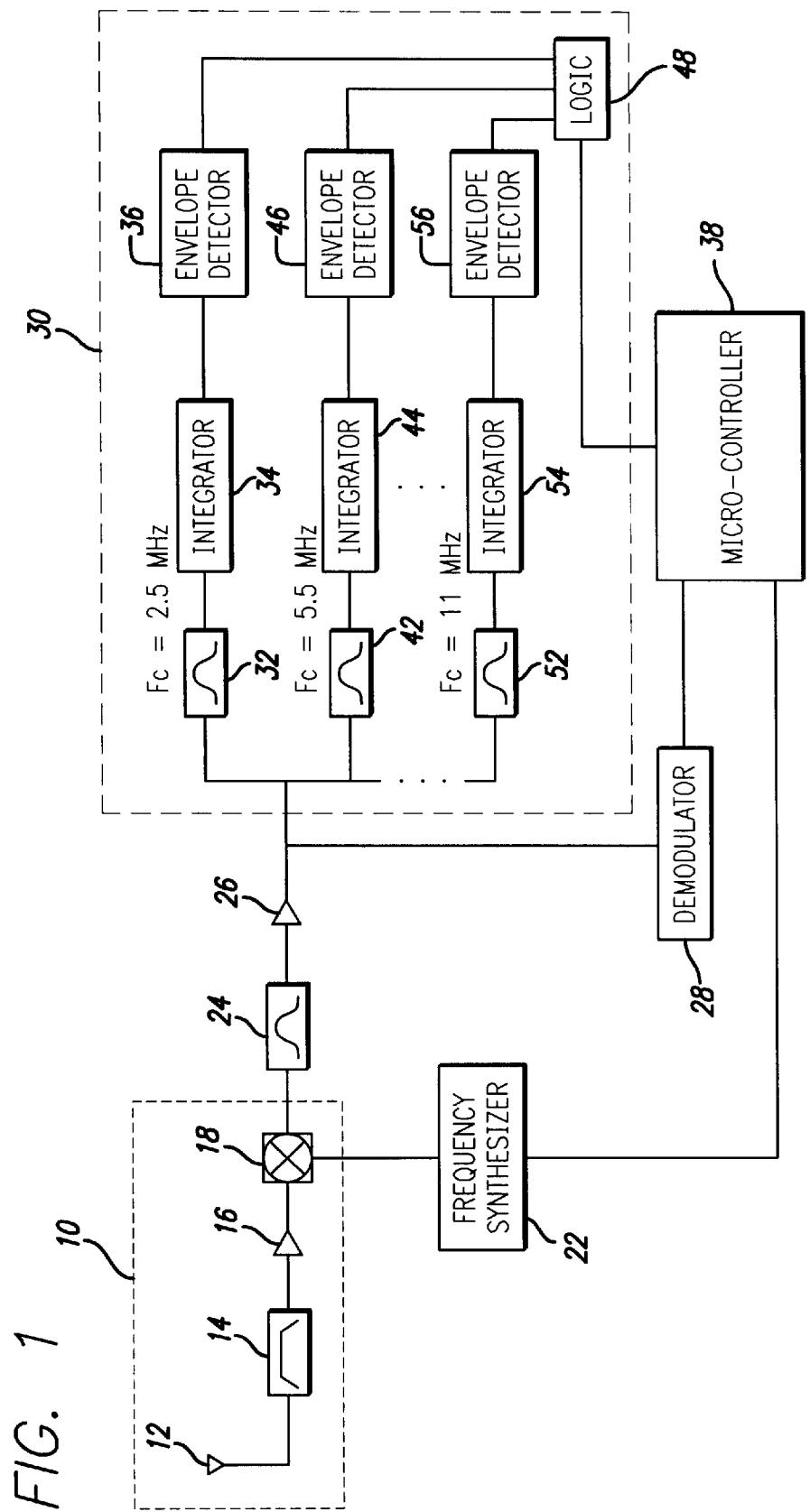
FIG. 1 is a block diagram of an RF receiver having a frequency-hopping/direct sequence discrimination circuit in accordance with the present invention.

Referring first to FIG. 1, a block diagram of a computing device in accordance with an embodiment of the present invention is illustrated. The computing device may be adapted to communicate either or both narrowband (i.e., frequency-hopping) signals and wideband (i.e., direct-sequence) spread spectrum RF signals. An RF receive section 10 includes an antenna 12, a filter 14, a low noise amplifier stage 16, and a downconversion mixer 18. The antenna 12 is provided for receiving RF signals that are transmitted within the WLAN. The filter 14 rejects adjacent extraneous frequencies outside the bandwidth of the received band of signals. The low noise amplifier stage 16 amplifies the received and filtered signal to a desired amplitude level and establishes a system noise figure. The mixer 18 multiplies the amplified signal with a locally generated oscillating signal from a frequency synthesizer 22 to produce an intermediate frequency (IF) signal having a constant difference in frequency between the received signal and the locally generated signal.

By selecting a frequency of the locally generated oscillating signal that is equal to the carrier frequency of the received narrowband or wideband signals, the IF signal produced by the mixer 18 would actually be downconverted directly to baseband in the manner of a homodyne or zero-IF receiver. An example of a homodyne receiver is provided by U.S. Pat. No. 5,495,500, for "Homodyne Radio Architecture For Direct Sequence Spread Spectrum Data Reception," the subject matter of which is incorporated by reference herein.

The IF signal is provided to a bandpass filter 24 having a bandwidth sufficient to accommodate the wideband direct-sequence spread spectrum signals. An IF amplifier 26 is used to adjust the signal level of the filtered IF signal to a level sufficient for demodulation. The gain of the IF amplifier 26 may be set at different levels depending on whether the received RF signal is a wideband or narrowband signal, as determined by the discrimination circuit described below. A demodulator 28 may be adapted to recover either or both frequency shift key (FSK) modulated signals from a frequency-hopping spread spectrum narrowband signal and direct-sequence wideband spread spectrum signal. Alternatively, separate demodulator circuits could be used for the narrowband and wideband signals that are selectively switched in the same manner as the bandpass filter 24 and IF amplifier 26.

A microcontroller 38 provides the main signal processing hardware for the radio receiver, and is responsible for controlling the bandwidth selection, frequency synthesizer programming, clock recovery and data handling/generation. The microcontroller 38 may be provided by an application specific integrated circuit (ASIC), a microprocessor, a digital signal processor or other such circuit element. As known in the art, the microcontroller 38 performs its functions by executing a series of commands or instructions, also referred to as a software program, that may be disposed on a permanent storage medium, such as a semiconductor read only memory (ROM) device or a magnetic medium. The frequency synthesizer 22 communicates with the microcontroller 38 to control the timing and selection of carrier frequencies. The oscillating signal from the frequency synthesizer 22 is provided to the mixer 18 of the receive section 10 as the oscillating signal, as described above. The microcontroller 38 may also perform other functions for the computing device pertaining to the processing and use of the information communicated by the RF signals.

A discrimination circuit 30 is also coupled to the output of the IF amplifier 26 to receive the filtered IF signal. The discrimination circuit 30 determines whether a received IF signal is a direct-sequence or frequency-hopping spread spectrum signal.

Before describing in detail the elements of the discrimination circuit 30, a brief discussion of the characteristics of direct-sequence and frequency-hopping signals is provided with reference to FIGS. 2A–2B and 3A–3B.

Figure 2A:
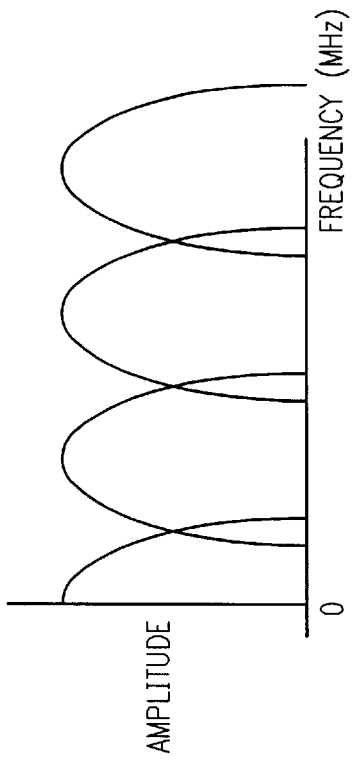
FIGS. 2(a) and 2(b) are graphs illustrating the average and instantaneous frequency spectra of direct-sequence spread spectrum signals.
Figure 2B:
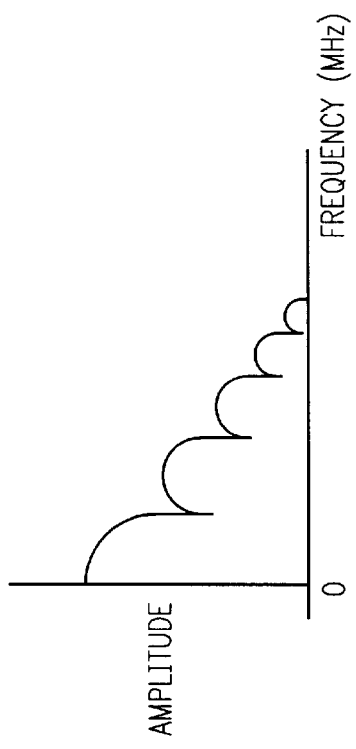

In FIGS. 2A–2B, the frequency spectra of a direct-sequence spread spectrum signal is illustrated. FIG. 2A illustrates the average frequency response of a direct-sequence spread spectrum signal. As known in the art, the power of a direct-sequence spread spectrum signal is spread over a wide band of frequencies. At any given instant, as shown in FIG. 2B, the power of the direct-sequence signal may be distributed into several discrete frequencies, as depicted by the exemplary varying amplitude signal impulses located at 2.25, 5.5, and 11 MHz.

Figure 3A:
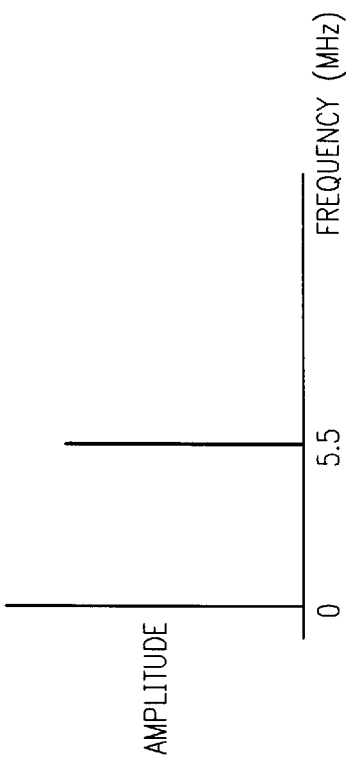
FIGS. 3(a) and 3(b) are graphs illustrating the average and instantaneous frequency spectra of frequency-hopping spectrum signals.
Figure 3B:
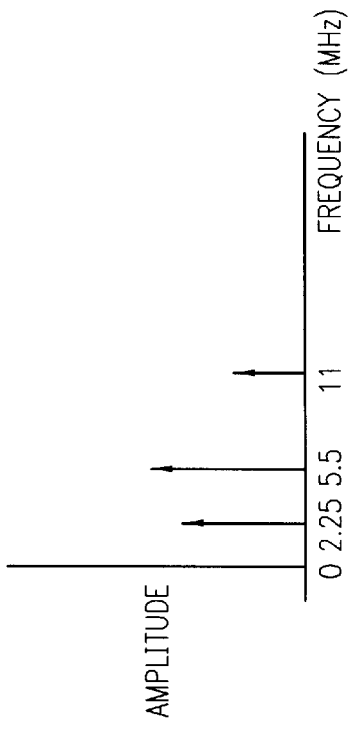

In contrast, the frequency spectra of a frequency-hopping spread spectrum signal is illustrated in FIGS. 3A–3B. As in direct-sequence spread spectrum, the power of frequency-hopping spread spectrum signals is spread over a wide band of frequencies; however, unlike direct-sequence spread spectrum, the frequency-hopping spread spectrum signals are actually comprised of a plurality of discrete narrowband channels. The narrowband channels each overlap slightly with adjacent channels as shown in FIG. 3A, though the channels may also be separated from each other. At a given instant of time, the power of a frequency-hopping spread spectrum signal will be entirely located in just one of the channels, such as the exemplary signal located at 5.5 MHz. Moreover, the amplitude of the signal is much greater than the corresponding signal impulses of the direct-sequence spread spectrum signals given identical path conditions.

Returning now to FIG. 1, the discrimination circuit 30 comprises a plurality of n discrete filter banks that are each tuned to respective ones of the frequency-hopping spread spectrum channels. A first filter bank comprises a bandpass filter 32, an integrator 34, and an envelope detector 36. A second filter bank comprises a bandpass filter 42, an integrator 44, and an envelope detector 46, and an nth filter bank comprises a bandpass filter 52, an integrator 54, and an envelope detector 56. It should be appreciated that three filter banks are illustrated in FIG. 1 for simplicity, but in a practical system there would be a plurality of other filter banks disposed in parallel corresponding to the number of frequency-hopping spread spectrum channels. The bandpass filters 32, 42, 52 are tuned to a center frequency ($F_c$) corresponding to separate frequency channels. For example, the center frequency ($F_c$) of the first bandpass filter 32 is 2.5 MHz, the center frequency ($F_c$) of the second bandpass filter 42 is 5.5 MHz, and the center frequency ($F_c$) of the nth bandpass filter 52 is 11 MHz.

The integrators 34, 44, 54 are coupled to the bandpass filters 32, 42, 52, and integrate the signals from the bandpass filters over a predetermined sampling time period. The sampling time ensures that extraneous noise signals are not misconstrued as information signals, since such noise signals would damp out quickly over time in comparison to information signals that would ordinarily have longer duration. The envelope detectors 36, 46, 56 coupled to the integrators 34, 44, 54 provide a signal indicative of the strength of received IF signal within the frequency band defined by the corresponding bandpass filters 32, 42, 52. A logic unit 48 is coupled to the outputs of each one of the envelope detectors 36, 46, 56, and determines whether a received IF signal is a frequency-hopping or direct-sequence spread spectrum signal. The logic unit 48 thereafter provides an identifying signal to the microcontroller 38 that advises which type of signal has been received. It should be appreciated that the logic unit 48 may be subsumed within the microcontroller 38, which would then determines the type of signal directly.

More particularly, if the logic unit 48 receives signals from plural ones of the envelope detectors 36, 46, 56 simultaneously that indicate the presence of RF energy in plural frequency bands, such as the example of FIG. 2B in which signal impulses are present at plural frequencies, then the logic unit would notify the microcontroller 36 that a direct-sequence spread spectrum signal is being received. The microcontroller 38 can then control operation of the receiver circuitry to optimize for direct-sequence spread spectrum communications, such as by directing the demodulator 28 to remove the spreading code to recover digital data. Alternatively, if the logic unit 48 only receives signals from one of the envelope detectors 36, 46, 56 indicating the presence of RF energy in only one frequency band, such as the example of FIG. 3B in which a received signal is present at a single frequency, then the logic unit would notify the microcontroller 38 that a frequency-hopping spread spectrum signal is being received. The microcontroller 38 can then control operation of the receiver circuitry to optimize for frequency-hopping spread spectrum communications, such as by decreasing the passband of the bandpass filter 24 and by controlling the demodulator 28 accordingly, or by shutting off the direct-sequence portion of the receiver circuitry until a direct-sequence spread spectrum signal is identified.

Even though analog processing circuitry for the discrimination circuit 30 has been described above with respect to FIG. 1, it should also be appreciated that digital processing circuitry may also be advantageously utilized. Particularly, the filtered IF signal from the IF amplifier 26 may be passed through an analog-to-digital converter to provide a digital signal. Digital circuit elements would then operate on the digital signal, including digital filter, integration and envelope detection stages. The digital circuit elements may be provided as separate discrete components. Alternatively, the functions provided by the digital circuit elements may be included within the microcontroller 38 either as embedded circuit elements or as software instructions executed by the microcontroller.

Having thus described a preferred embodiment of a receiver having frequency-hopping/direct-sequence spread spectrum signal discrimination, it should be apparent to those skilled in the art that certain advantages of the within described system have been achieved. It should also be appreciated that various modifications, adaptations, and alternative embodiments thereof may be made within the scope and spirit of the present invention. The invention is further defined by the following claims.

What is claimed is:

1. A receiving device for use in an environment in which both frequency-hopping and direct-sequence spread spectrum radio frequency (RF) signals are present, comprising:

an RF receiver for receiving RF input signals;

a detector coupled to said receiver and having a plurality of parallel stages, each one of said stages sampling an RF energy level within a distinct band of frequencies; and a discriminator coupled to said detector for discriminating said RF input signals between frequency-hopping and direct-sequence spread spectrum signals, wherein said RF input signals comprise direct-sequence spread spectrum signals when RF energy is present in more than one of said stages, and said RF input signals comprise frequency-hopping spread spectrum signals when RF energy is present in only one of said stages.

2. The device of claim 1, further comprising a controller for controlling said receiver responsive to said discriminator.

3. The device of claim 2, further comprising a demodulator coupled to said receiver and said controller, said demodulator recovering data from said received RF input signals, said controller modifying operation of said demodulator responsive to said discriminator.

4. The device of claim 1, wherein each one of said stages comprises an integrator adapted to integrate received RF energy over a predetermined sampling time.

5. The device of claim 1, wherein each one of said stages comprises a filter tuned to one of said distinct frequency bands.

6. The device of claim 5, wherein said filter further comprises an analog filter.

7. The device of claim 5, wherein said filter further comprises a digital filter.

8. A receiver for use in an environment in which both frequency-hopping and direct-sequence spread spectrum radio frequency (RF) signals are present, comprising:

means for receiving and downconverting RF input signals; and means for discriminating said RF input signals between frequency-hopping and direct-sequence spread spectrum signals by sampling energy level present in each one of a plurality of distinct frequency bands, wherein said RF input signals comprise direct-sequence spread spectrum signals when RF energy is present in more than one of said plurality of distinct frequency bands, and said RF input signals comprise frequency-hopping spread spectrum signals when RF energy is present in only one of said distinct frequency bands.

9. The receiver of claim 8, further comprising means for recovering data from said downconverted RF input signals in response to said discriminating means.

10. The receiver of claim 8, wherein said discriminating means comprises a plurality of parallel stages and a detector coupled to said stages, each one of said stages being tuned for a distinct frequency band, said detector being adapted to sample an RF energy level passing through said stages and provide a signal indicating whether said RF input signals are frequency-hopping or direct-sequence spread spectrum signals.

11. The receiver of claim 10, wherein each one of said stages comprises a filter tuned to one of said distinct frequency bands.

12. The receiver of claim 10, wherein each one of said stages comprises an integrator adapted to integrate received RF energy over a predetermined time.

13. The receiver of claim 10, wherein each one of said stages comprises an analog filter.

14. The receiver of claim 10, wherein each one of said stages comprises a digital filter.

15. The receiver of claim 8, wherein said data recovering means comprises a demodulator coupled to said receiving means.

16. In an environment in which both frequency-hopping and direct-sequence spread spectrum radio frequency (RF) signals are present, a method for receiving data comprises:

receiving and downconverting RF input signals; and discriminating said RF input signals between frequency-hopping and direct-sequence spread spectrum signals by sampling energy level present in each one of a plurality of distinct frequency bands, wherein said RF input signals are direct-sequence spread spectrum signals when RF energy is present in more than one of said plurality of distinct frequency bands, and said RF input signals are frequency-hopping spread spectrum signals when RF energy is present in only one of said plurality of distinct frequency bands.

17. The method of claim 16, further comprising recovering data from said downconverted RF input signals in response to said discriminating step.

18. The method of claim 16, wherein said discriminating step comprises providing a signal indicating whether said RF input signals are frequency-hopping or direct-sequence spread spectrum signals.

19. The method of claim 16, wherein said discriminating step comprises integrating received RF energy over a predetermined sampling time.

* * * * *